United States Patent [19]

Huey et al.

[11] Patent Number: 4,636,234
[45] Date of Patent: Jan. 13, 1987

[54] METHOD AND APPARATUS FOR MAKING NON-CIRCULAR MINERAL FIBERS

[75] Inventors: Larry J. Huey; Paul D. Beuther, Both of Granville, Ohio

[73] Assignee: Owens-Corning Fiberglas Corporation, Toledo, Ohio

[21] Appl. No.: 830,382

[22] Filed: Feb. 14, 1986

Related U.S. Application Data

[63] Continuation-in-part of Ser. No. 677,451, Dec. 3, 1984, abandoned.

[51] Int. Cl.⁴ .......................................... C03B 37/022
[52] U.S. Cl. ................................................ 65/2; 65/1; 65/12; 264/177 F; 264/177.1; 425/76; 425/463; 428/399
[58] Field of Search ............... 65/1, 2, 8, 12; 264/177 F; 425/76, 463; 428/399

[56] References Cited

U.S. PATENT DOCUMENTS

| | | | |
|---|---|---|---|
| 2,294,266 | 8/1942 | Barnard | 65/1 |
| 2,453,864 | 11/1948 | Schlehr | 65/12 X |
| 2,465,283 | 3/1949 | Schlehr | 65/12 X |
| 2,578,986 | 12/1951 | Schoonenberg et al. | |
| 2,908,036 | 10/1959 | Russell | 65/12 |
| 3,063,094 | 11/1962 | Warthen | |
| 3,268,313 | 8/1966 | Burgman et al. | 65/2 X |
| 3,425,454 | 2/1969 | Eakins et al. | 65/2 X |
| 3,600,491 | 8/1971 | Shimoda et al. | 264/177 F |
| 3,607,185 | 9/1971 | Andrysiak | 65/1 X |
| 3,623,939 | 11/1971 | Ono et al. | 264/177 F X |
| 3,650,716 | 3/1972 | Brossard | |
| 3,775,074 | 11/1973 | Russell | 65/8 X |
| 3,912,478 | 10/1975 | Presby | |
| 3,914,488 | 10/1975 | Gorrafa | 264/177 F X |
| 4,001,369 | 1/1977 | Shah | 264/177 F X |
| 4,028,081 | 6/1977 | Marcatili | |
| 4,038,062 | 7/1977 | Presby | |
| 4,050,915 | 9/1977 | Brown | |
| 4,091,065 | 5/1978 | Shah | 264/177 F |
| 4,144,044 | 3/1979 | Russell | |
| 4,307,478 | 12/1981 | Ward et al. | 428/399 X |
| 4,316,924 | 2/1982 | Minemura et al. | 428/399 X |
| 4,329,163 | 5/1982 | Russell | 65/12 X |
| 4,349,364 | 9/1982 | Morrison | |
| 4,362,541 | 12/1982 | Thompson | 65/12 X |
| 4,376,746 | 3/1983 | Ward et al. | 264/177 F X |
| 4,385,916 | 5/1983 | Jochem et al. | |
| 4,391,618 | 7/1983 | Lecron | |
| 4,398,933 | 8/1983 | Lecron | |
| 4,401,451 | 8/1983 | Lecron | |
| 4,437,869 | 2/1984 | Lecron | |
| 4,469,499 | 9/1984 | Lecron | |

FOREIGN PATENT DOCUMENTS 835428 12/1938 France .................................... 65/12

OTHER PUBLICATIONS

"Cooling of a Free Jet with Variable Viscosity" Paper # 68-FF-19 Transactions of the ASME Glicksman 10/1968.

Primary Examiner—Robert Lindsay
Attorney, Agent, or Firm—Ronald C. Hudgens; Greg Dziegielewski; Ted C. Gillespie

[57] ABSTRACT

A method and apparatus for making non-circular mineral fibers, and the fibers produced thereby, comprises flowing a stream from a body of molten mineral material through a non-circular orifice, and quenching the mineral material in the stream to form a mineral fiber having a non-circular cross-section.

34 Claims, 17 Drawing Figures

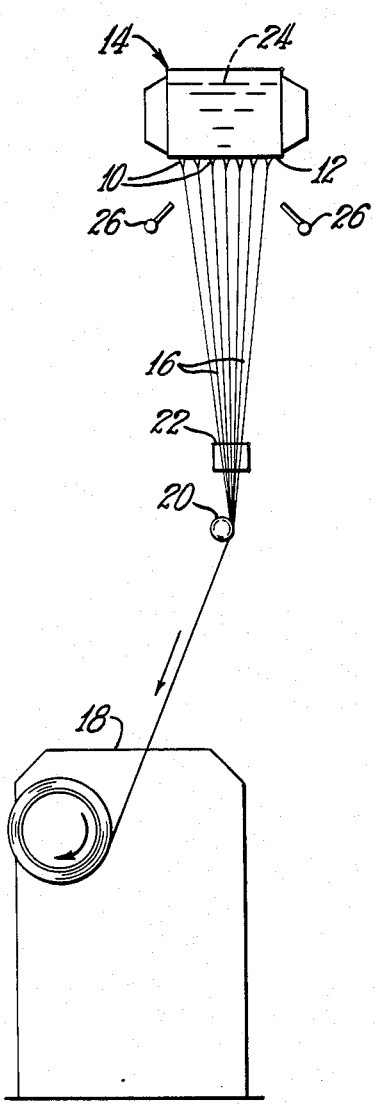
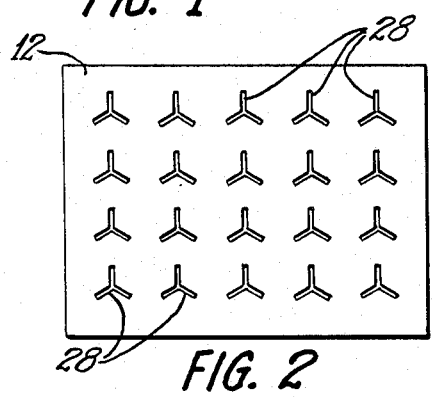
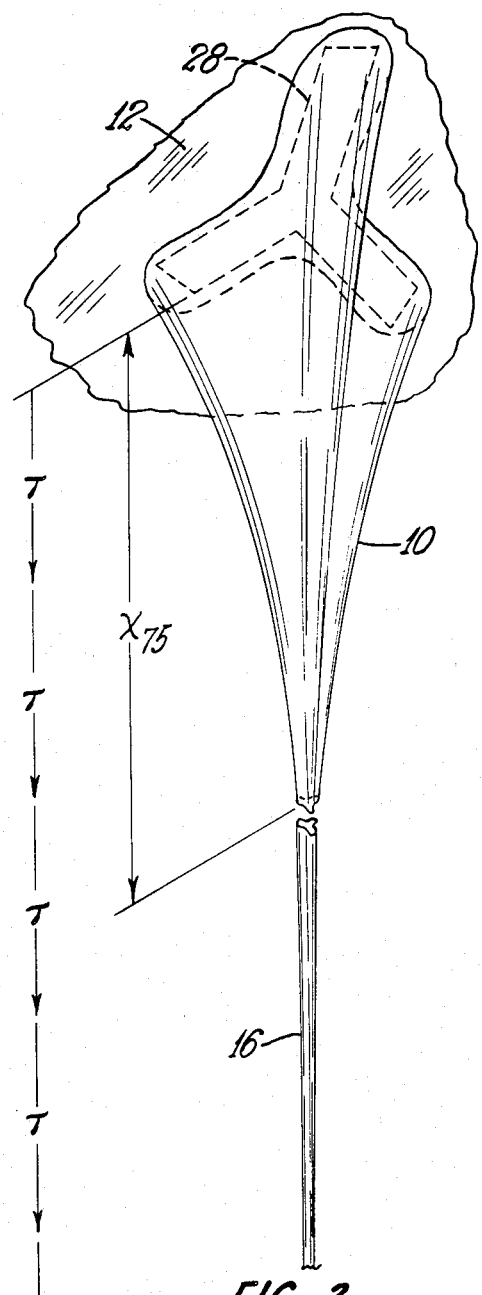
FIG. 1
FIG. 2
FIG. 3

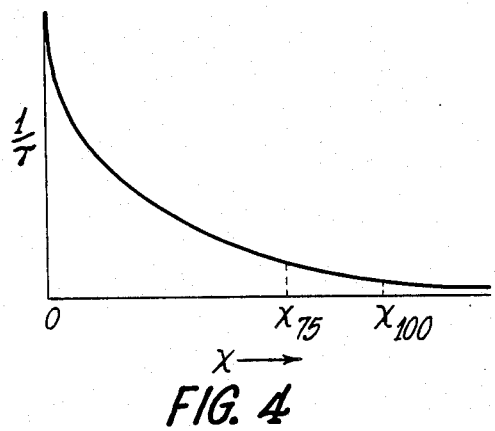
FIG. 4
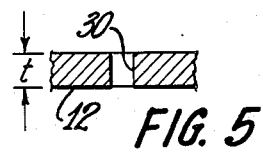
FIG. 5
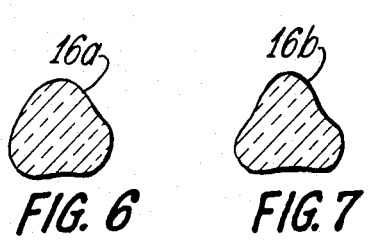 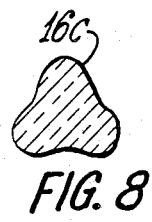 
FIG. 6   FIG. 7   FIG. 8   FIG. 9
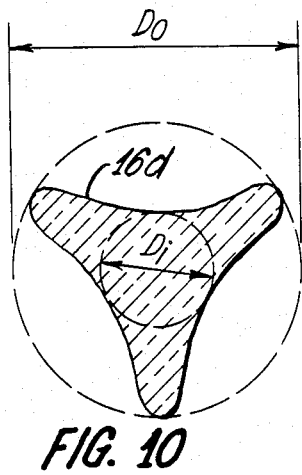
FIG. 10
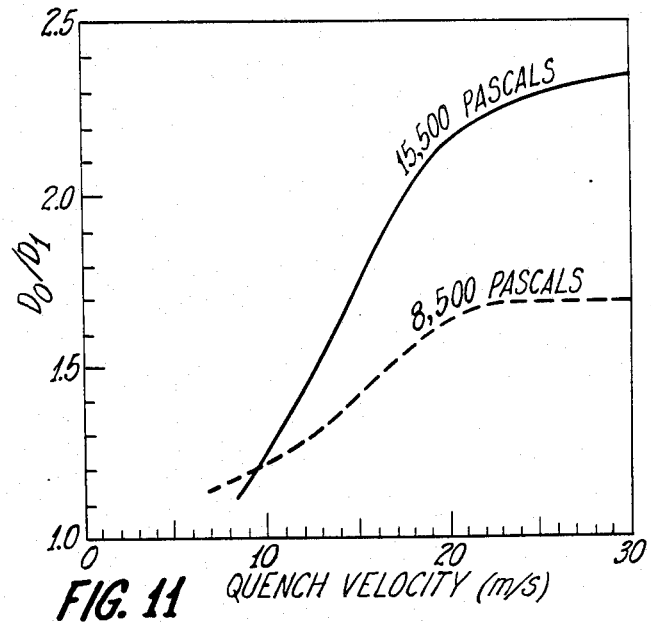
FIG. 11

METHOD AND APPARATUS FOR MAKING NON-CIRCULAR MINERAL FIBERS

This is a continuation-in-part of Ser. No. 677,451, Filed Dec. 3, 1984 now abandoned.

TECHNICAL FIELD

This invention pertains to mineral fibers and the manufacture of mineral fibers for such uses as textiles, reinforcements, construction materials, and insulating materials. With respect to this invention, mineral fibers means fibers of glass, rock, slag or basalt. In one of its more specific aspects, this invention pertains to non-circular mineral fibers and, in particular, non-circular glass fibers.

BACKGROUND OF THE INVENTION

The production of wool glass fibers by means of the rotary process is well known. In general, molten glass is fed into a spinner which revolves at high speeds. The spinner has a peripheral wall containing a multiplicity of orifices. Molten glass passed by centrifugal force through the orifices of the peripheral wall forms small diameter molten glass streams. Positioned circumferentially about the spinner in an annular blower for turning the fibers downwardly and, in some cases, for further or secondary attenuation of the original or primary fibers to produce fibers of smaller diameter. As the streams of molten glass are emitted from the orifices, they are still sufficiently nonviscous that surface tension forces pull or shape each of the molten streams into substantially circular cross-sections, regardless of the cross-sectional shape of the streams as they are emitted from the orifices. Further, rotary fiberizers are typically equipped with annular burners or other sources of hot gases for secondary attenuation of the primary fibers; these hot gases keep the glass sufficiently fluid or nonviscous that fibers of substantially circular cross-section result.

The production of textile or continuous glass fibers by mechanically drawing molten streams of glass from orifices in the bottom wall of a bushing or feeder is also well known. Non-uniformities in the roundness of the molten streams tend to be corrected by surface tension forces prior to the cooling and hardening of the molten streams into glass fibers. Thus, as in the case of wool glass fiber production, it has not been possible to produce significantly non-circular continuous fibers using shaped orifices in a bushing.

There has long been a need for producing fibers, both in the rotary process and in the continuous fiber process, that have significantly non-circular cross-sections. With respect to reinforcement of resin matrices, such non-circular fibers would be useful in imparting greatly increased transverse strength and improved shear strength qualities. Non-circular fibers for use as insulation materials would be advantageous in that the increased surface area per unit volume of glass would lower the thermal conductivity of insulation made from such fibers.

A measure of the non-circularity of mineral fibers is the "mod ratio", which is defined as the ratio of the diameter of the smallest circle into which the fiber cross-section fits to the diameter of the largest circle which can fit inside the fiber cross-section. As employed herein, fibers having a mod ratio of less than 1.2 are referred to as circular fibers; fibers having a mod ratio greater than or equal to 1.2 are referred to as non-circular fibers.

One attempt to make non-circular glass fibers was by Warthen, as described in U.S. Pat. No. 3,063,094. Warthen's method employs mechanical perturbation of the glass stream while it is still in plastic, deformable state. Warthen teaches that to create a non-circular fiber, the glass stream, initially in a conical shape with a circular cross-section, should be distorted at a region where the viscosity of the stream is sufficiently high as to become rapidly chilled or solidified during attenuation of the streams to a continuous fiber whereby a similar distortion in the cross-section configuration is retained in the attenuated solidified fiber. Warthen also teaches that a heat sink is to be applied to the glass stream by direct contact. This raises the viscosity of the molten glass to better enable retention and perpetuation of the non-circular cross-sectional character of the mechanically perturbed molten glass stream.

Other attempts at producing non-circular fibers have been shown in the art. Processes are known for modifying round glass fibers in order to produce optical fiber wave guides of a non-circular shape. In some cases, a double crucible method is employed for making an optical fiber in which the inner fiber core has a non-circular cross-section. It is also known in the art of making glass fibers to use a mechanical stirrer positioned within the fiber forming cone to produce a twisted or distorted fiber.

In the art of producing organic fibers, it is a common practice to use quenching methods to solidify molten streams of organic material into non-circular cross-sections which are similar to the shapes of the non-circular orifices. However, these methods are practical under conditions which differ greatly from conditions associated with forming mineral fibers. The production of organic non-circular fibers can be facilitated by pressurization of the bushings, whereas pressurization of bushings containing molten glass present severe operating problems. The melting points of glass and organic compositions differ by 1500° F. (815° C.) or more. The mineral material of this invention will have a liquidus temperature greater than about 1200° F. (649° C.), whereas organic compositions soften and/or decompose at much lower temperatures.

The differences in physical characteristics can be clearly understood by comparing the ratio of viscosity-to-surface tension for glass with the same ratio for organic fiber forming material. The viscosity-to-surface tension ratio (poises/(dynes/cm)) of polymers lies within the range of from about 25 to about 5000. The ratio for glass is within the range of from about 0.1 to about 25, preferably within the range of from about 0.25 to about 15, and most preferbly within the range of from about 0.4 to about 10. The viscosity of molten glass at fiber forming temeperatures is typically about 300 poises whereas the viscosity of the molten organic material is typically on the order of about 1000 to about 3000 poises. Also, the surface tension forces of glass (on the order of about 250 to about 300 dynes/cm) are an order of magnitude greater than those of the organic material (about 30 dynes/cm). The lower viscosity and higher surface tension of glass make it about 100 times more difficult to prevent the shaped glass fibers from re-forming into glass fibers having circular cross-sections.

In spite of past attempts to manufacture non-circular mineral fibers, there has never been a commercially successful method or apparatus for achieving the goal of making non-circular fibers from non-circular orifices.

STATEMENT OF THE INVENTION

It has now been found that mineral fibers, such as glass fibers, can be produced with non-circular cross-sections by discharging streams of molten mineral material from non-circular orifices and forceably quenching the streams sufficiently fast to harden them into non-circular mineral fibers. This forceable cooling of the streams hardens them into fibers with non-circular cross-sections before surface tension forces can cause the streams to assume circular cross-sections. The rapid cooling aspect of this invention enables the production of mineral fibers having higher mod ratios than those practically feasible with the processes of the prior art. The invention can be employed in both the rotary process and in a continuous fiber process.

Although the preferable means for quickly quenching the streams is a relatively cold (e.g., room temperature) gaseous flow, such as air, directed into contact with the streams, any suitable means for rapidly cooling the streams, such as fluid flow, water spray, liquid bath, ultrasonics or fin shields, can be employed. Streams having greater mod ratios will, in general, have greater surface areas (i.e., greater perimeter of the stream cross-section) and hence greater heat transfer characteristics (and quench rates) than those streams with lesser mod ratios. When using a cooling gas, the temperature and velocity of the cooling gas flow also affect the quench rate, as does the velocity of the streams and the time required for passage of the streams through the quenching gas flow as well as the distance traveled before the streams are hardened into fibers.

The mineral fiber forming process of this invention can be affected by numerous variables, including inertia forces (hydrostatic head or pressurization in a textile process; hydrostatic head forces in a rotary process), body forces in a rotary process, initial temperature and viscosity of the mineral material, thickness or depth of the non-circular orifice, surface tension characteristics of the molten mineral material, speed at which the streams are traveling, and the rate at which the streams are quenched.

Pressurization of the body of molten glass, or the inertial force on the glass from the spinner, or the mechanical pulling force in a continuous fiber process, can affect the ultimate mod ratio of the mineral fibers. To the extent that surface tension forces start to act to re-form the streams into circular cross-sections before the streams reach the cooling gas flow, the source of which may be positioned some distance below the non-circular orifices, the time for the streams to reach the region of the cooling gas flow may be critical.

According to this invention, there is provided a method of making non-circular mineral fibers comprising discharging molten mineral material from non-circular orifices to produce streams of non-circular cross section, and cooling the streams to harden them into fibers having a non-circular cross-sectional shape similar to the shape of the orifices before the streams can assume a circular cross-section. A plurality of such orifices can be positioned in a wall of a container for a body of molten mineral material. The container can be, for example, a spinner or a feeder.

According to this invention, there is also provided a method of making non-circular mineral fibers comprising discharging molten mineral material from non-circular orifices positioned in a bushing wall to produce streams of non-circular cross-section and cooling the streams to harden them into fibers having a non-circular cross-sectional shape similar to the shape of the orifices before the streams can assume a circular cross-section.

According to this invention, there is also provided a non-circular mineral fiber produced according to the method of the invention.

According to this invention, there is also provided a matrix reinforced with minearl fibers produced according to the method of the invention.

In one aspect of the invention, the quenching of the mineral material is effected by directing a cooling fluid into contact with the glass stream in an amount and at a locus sufficient ot prevent the material from assuming a circular cross-section.

In another aspect of the invention, the cooling is sufficient to satisfy the equation $Z \leq 2$ where $$Z = (x_{75}\sigma_o/\mu_o r_{eo}) * 1/(MR_o - 1)$$

and where $X_{75}$ is the distance from the bushing at 75 percent attenuation (centimeters), $\mu_o$ is the initial viscosity (poise), $r_{eo}$ is the initial equivalent fiber radius (centimeters), $\sigma_o$ is the initial surface tension of the mineral material (dynes/cm), $v_o$ is the initial velocity (cm/sec) through the orifices and $MR_o$ is the initial mod ratio of the streams.

In yet another aspect of the invention, a non-circular cross-sectional shape similar to the shape of the orifices is preserved in the mineral fibers in the absence of perturbation of the streams. In another embodiment of the invention, each stream from each of the orifices is hardened into a mineral fiber without coming into contact with another of the streams.

According to this invention, there is also provided apparatus for making non-circular mineral fibers comprising an orificed bushing for discharging one or more streams of molten mineral material, the orifices having a mod ratio greater than about 1.2, and means for quenching the streams to form mineral fibers having a non-circular cross-sectional shape similar to the shape of the orifices. Preferably, the orifices have a mod ratio within the range of from about 1.2 to about 50, more preferably within the range of from about 1.3 to about 25, and most preferably within the range of from about 1.7 to about 10. The orifices can be trilobal, with the three lobes being generally, evenly, angularly spaced from each other.

In yet another aspect of the invention, the bushing is also equipped with circular orifices for the simultaneous production of both circular fibers and non-circular fibers.

DESCRIPTION OF THE DRAWINGS

FIG. 1 is a schematic view in elevation of one apparatus for forming continuous non-circular glass fibers from a bushing according to the principles of the invention.

FIG. 2 is an upward plan view of a bushing bottom plate containing an array of non-circular orifices.

FIG. 3 is a perspective view of a non-circular orifice of FIG. 2, and a non-circular glass fiber being formed.

FIG. 4 is a graph of fiber characteristics as a function of distance from the bushing.

FIG. 5 is a schematic view in elevation of a non-circular orifice according to the principles of the invention.

FIGS. 6 through 9 illustrate non-circular cross-sections of glass fibers made under various conditions of quenching.

FIG. 10 is an enlarged cross-sectional view of the trilobal glass fiber of FIG. 9.

FIG. 11 is a graph indicating the relationship between the mod ratio and quench velocity.

DESCRIPTION OF THE INVENTION

Figure 12:
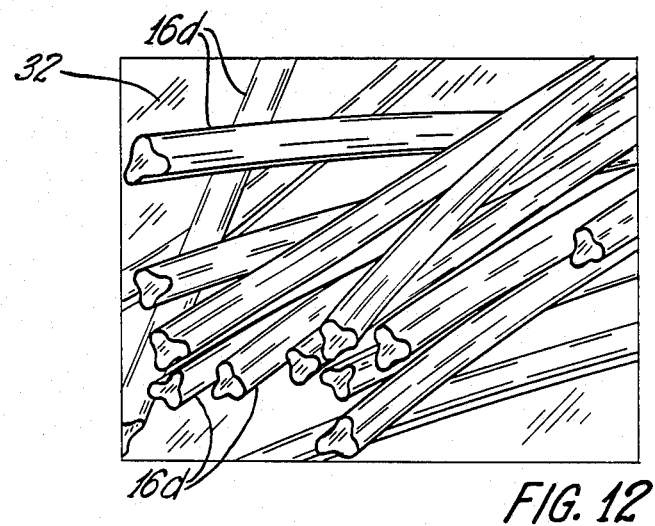
FIG. 12 is an isometric view in perspective of a resin matrix reinforced with non-circular fibers.

This invention will be described in terms of a glass fiber forming process and apparatus, and products made thererfrom, although it is to be understood that the process is suitable for fibers or other mineral materials, particularly of such mineral materials as rock, slag and basalt.

As shown in FIG. 1, molten glass streams 10 are emitted from orificed bushing bottom wall 12 of feeder or bushing 14, and the drawn into fibers 16 by any suitable means, such as by the mechanical action of winder 18. Gathering shoe 20 and size applicator 22 can be employed in the manner well known in the art. The bushing contains a body of molten glass 24 from which the streams of molten glass are drawn. As illustrated, air nozzles 26, which are means for quenching the streams of molten glass, are positioned to direct air into contact with the molten streams as they are emitted from the bushing bottom wall. The air flow cools the molten streams quickly enough into glass fibers so that they retain the general non-circular shape of the molten streams. Other suitable cooling fluids, such as carbon dioxide, nitrogen, steam or water, can be employed to forceably cool the streams.

As shown in FIGS. 2 and 3, the bushing bottom wall contains trilobal orifices 28, having the lobes positioned evenly around the periphery. The orifices and the resulting fibers can be of various shapes, such as, for example, cross-shaped, star-shaped, pentalobal, octalobal, or rectangular.

In order to quantitatively describe the formation of non-circular glass fibers, it is useful to consider a time constant $\tau$ for the decay of the shape from non-circular cross-section back to circular cross-section. As soon as a molten glass stream of non-circular cross-section flows from a non-circular orifice, surface tension forces act on the stream to change it into a circular cross-section. Opposing these forces are viscous forces, which tend to resist changes in the shape of the stream. The viscous forces increase extremely rapidly because of cooling as the molten glass in the stream moves away from the orifice. In order to successfully make non-circular fibers, the viscous forces (i.e., the viscosity) must be increased quickly enough to retard the effect of the surface tension forces.

The time constant is believed to be the function of the viscosity of the glass, the equivalent radius of the glass stream, and the surface tension, according to the equation: $\tau = \mu r / \sigma$. This equation can be transformed with a velocity factor to enable integration over distance along the fiber, i.e., vertical distance downward from the orifice, instead of with respect to time. In operation, when only a few time constants pass prior to the hardening or greatly increased viscosity of the glass, the fiber still maintains its non-circular shape. When many time constants pass, however, prior to reaching high viscosity, the glass stream returns to a circular cross-section and produces a circular fiber. When the inverse of the time constant is integrated over the distance to 100% attenuation, the ratio of the time-to-become-viscous to the time-to-revert-to-a-circular-cross-section is obtained. This ratio, difficult to measure exactly, can be estimated by the ratio Z, as given by the following equation:

$$Z = (x_{75} \sigma_o / \mu_o r_{eo}) * (1/v_o) * 1/(MR_o - 1)$$

where:
- $x_{75}$ is the distance from the bushing at 75 percent attenuation (cm);
- $\mu_o$ is the initial viscosity (poise);
- $r_{eo}$ is the initial equivalent fiber radius (cm);
- $\sigma_o$ is the initial surface tension of the mineral material (dynes/cm);
- $v_o$ is the initial velocity (cm/sec) through the orifices; and
- $MR_o$ is the initial mod ratio of said streams.

The factor $1/(MR_o - 1)$ is a factor indicative of the mod ratio fo the hole, and hence the initial mod ratio of the glass stream. It has been found that this equation correlates very well with theoretical considerations as shown in FIG. 4 where the curve represents the reciprocal of the time constant as a function of distance from the bushing. The integral is the area underneath the curve, and the smaller the area underneath the curve, the smaller the number of time constants experienced by the stream before hardening and therefore the greater the mod ratio. It has been found that in order for the final fiber to be non-circular, Z should be less than or equal to 2, and preferably less than or equal to 1.

The inertia forces or glass pressure at the orifices can affect the extent to which non-circular fibers can be formed. The pressure can be produced by any means, such as the hydrostatic head of the molten glass, gas pressurization of the feeder, or a combination of both. For the production of continuous glass fibers, the hydrostatic pressure is preferably within a range of from about 0.4 psig (2,800 Pascals) to about 100 psig (690,000 Pascals). Most preferably, the molten mineral material will be subjected to a hydrostatic pressure within the range of from about 0.7 psig (4,800 Pascals) to about 5.0 psig (34,000 Pascals).

Although the bushing shown in FIGS. 1-3 contains tipless orifices, the invention can be performed with tipped orifices as well. The orifice in FIG. 5 has depth "t". It has been found that shallower or less deep orifices enable an improvement or increase in the mod ratio of the non-circular fibers. Preferably, the depth of the orifices is within the range of from about 0.001 in. (0.025 mm) to about 0.250 in. (6.4 mm). Most preferably, the depth is within the range of from about 0.002 in. (0.051 mm) to about 0.030 in. (0.76 mm). Preferably, the orifice walls 30 are of substantially uniform height with respect to the bushing. Also the orifices are preferably defined by orifice walls of substantially uniform temperature.

The mineral fibers produced according to this invention will, in general, have equivalent diameters within the range of from about $0.2 \times 10^{-5}$ in. (0.05 microns) to about $300 \times 10^{-5}$ in. (76 microns), although non-circular fibers outside this range are possible. Preferably, the mineral fibers are within the range of B to Y filaments, i.e., within the range of from about $10 \times 10_{-5}$ in. (2.5 microns) to about $120 \times 10^{-5}$ in. (30 microns). Most preferably, the mineral fibers of this invention are G through T filaments, within the range of from about $35 \times 10^{-5}$ in. (8.9 microns) to about $95 \times 10^{-5}$ in. (24 microns).

FIGS. 6 through 9 illustrate cross-sections of four non-circular fibers produced from apparatus similar to that shown in FIGS. 1-3. These fiber cross-sections are all similar in shape to the trilobal orifice. The apparatus was controlled at substantially constant operating conditions except for the velocities of the quenching fluid. The velocities were different for each of the fibers. It is believed that the rate at which the molten glass streams is cooled is a function of the velocity of the quenching medium when all other conditions are equal. Fiber 16a in FIG. 6 was produced with a quench air velocity at the bushing orifice of approximately 10 meters per second, and has a mod ratio of about 1.35. Non-circular fiber 16b shown in FIG. 7 was produced with a quench rate of approximately 15 meters per second, and has a mod ratio of about 1.45. Fiber 16c shown in FIG. 8, having a mod ratio of about 1.75, was produced with a quench rate of approximately 20 meters per second. Non-circular fiber 16d shown in FIG. 9, having a mod ratio of about 2.70, was produced with a quench rate of approximately 30 meters per second. Although quench velocities of up to 60 meters per second, or more, could possibly be used with the invention, it has been found that the preferred quench velocity of room-temperature (approximately 80° F., 27° C.) air is below about 40 meters per second. Most preferably, the quench rate is within the range of from about 5 to about 30 meters per second. These quench velocities are in contrast to those used in normally operating air-quenched bushings used to prevent flooding, which have quench rates at the bushing tips on the order of about 2 to 4 meters per second.

As shown in FIG. 10, the dimensions of non-circular fiber 16d can be characterized by using the mod ratio, which is the outer diameter $D_o$ divided by the inner diameter $D_i$. The outer diameter is the smallest circle into which the entire cross-section can be placed. The inner diameter is the largest circle which can be positioned within the fiber cross-section.

Another measure of the non-circularity of fibers is the surface area ratio, which is the ratio of the fiber perimeter to the perimeter of an equivalent round fiber. Circular and non-circular fibers are "equivalent" with respect to cross-sectional area when they have the same cross-sectional area. The surface area ratio is useful in characterizing fiber having cross-sections of relatively high perimeters, with substantially equivalent areas as those of circular fibers. For example, a multilobal fiber with a large number of very small lobes would not differ greatly in cross-sectional area from an equivalent circular fiber, but would have a significantly greater perimeter, and thus a greater effective surface area. The surface area ratio fo a circular fiber is 1. The non-circular mineral fibers of this invention preferably have a surface area ratio greater than about 1.1. Most preferably, the surface area ratio is within the range of from about 1.1 to about 5.

Another measure of the non-circularity of fibers is the polar moment of inertia ratio, which is the ratio of the polar moment of inertia of a non-circular fiber to the polar moment of inertia of an equivalent circular fiber having the same cross-sectional area. The polar moment of inertia ratio is a measure of the eccentricity of the fiber with respect to an equivalent circular fiber. The polar moment of inertia about a central point (center of gravity) is given by $\int r^2 da$. The equivalent round fiber is given by the expression $\pi r_e^4/2$. In a preferred embodiment of the invention, the non-circular fibers have a polar moment of inertia ratio greater than about 1.1, and most preferably a polar moment of inertia ratio within the range of from about 1.1 to about 7. Also, the polar moment of inertia ratio of the shape of the orifices is within the range of from about 1.1 to about 50.

Yet another measure of the non-circularity of fibers is the inertial balance, which is the ratio of the maximum moment of inertia to the minimum moment of inertia for the fiber cross-section. The inertial balance ratio is useful where the moment of inertia is different in different directions. In the preferred embodiment of the invention, the inertial balance of the non-circular fibers is greater than 1, and most preferably within the range of from about 1.1 to about 25. Also, the inertial balance of the shape of the orifices is within the range of from about 1.1 to about 100.

As shown in FIG. 11, the mod ratio increases with an increase in the quench velocity. It is also shown that when the bushing is pressurized, the mod ratio increases.

Figure 13:
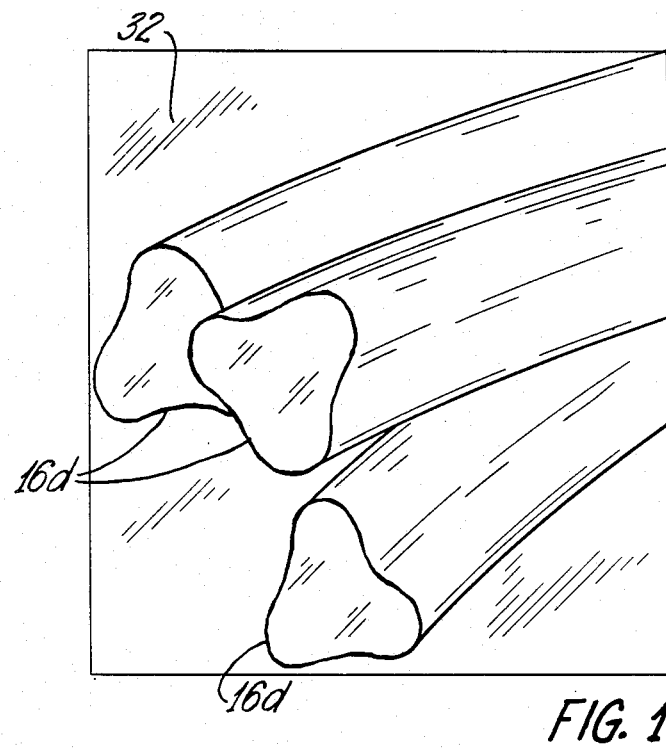
FIG. 13 is an enlarged isometric view in perspective of three of the trilobal fibers of FIG. 12.

As shown in FIGS. 12 and 13, continuous trilobal fibers 16d can be made and positioned in a matrix, such as plastic resin 32, for reinforcement. The mineral fibers of this invention can be used to reinforce any organic or inorganic matrix suitable for use with other types of reinforcement. For example, thermoplastic or thermoset resins, such as polyesters or epoxies, could be used. Cements, low melting point metals, and silicate matrices could also be reinforced. Matrices reinforced with non-circular mineral fibers of this invention could also be simultaneously reinforced by any other suitable reinforcement, such as circular mineral fibers or organic fibers.

Non-circular mineral fibers of this invention preferably should have the characteristic that when used to reinforce an organic matrix the fibers provide increased transverse tensile strength, within the range of from about 10 percent increase to about 100 percent increase, and most preferably within the range of from about 10 percent increase to about 40 percent increase, as compared with the equivalent circular fibers, as measured by ASTM Standard D 3039. The non-circular mineral fibers should also preferably provide increased NOL shear strength, as measured by ASTM Standard D2344, within the range of from about 10 percent increase to about 100 percent increase, and most preferably within the range of from about 10 percent increase to about 40 percent increase, as compared to equivalent circular fibers.

Figure 14:
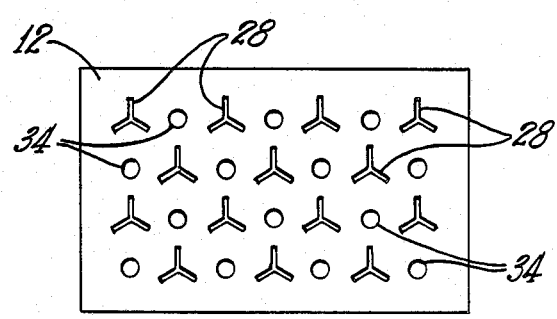
FIG. 14 is an upward plan view of a bushing bottom wall containing both circular and non-circular orifices.

As shown in FIG. 14, the bushing bottom wall 12 can contain both non-circular orifices 28a and circular orifices 34 to produce strands of fibers, some of which have circular cross-sections and some of which have non-circular cross-sections.

Figure 18:
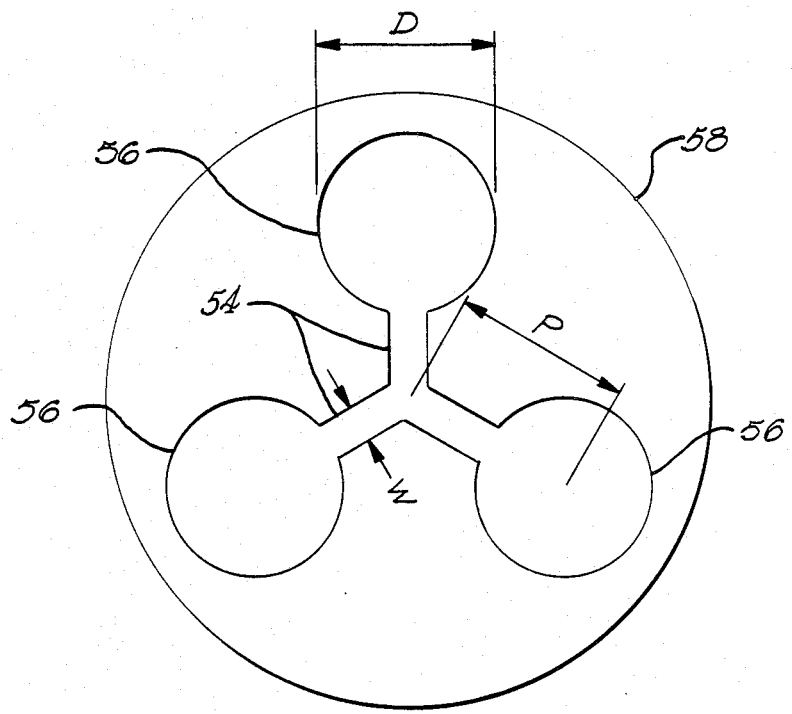
FIG. 18 is a plan view of an embodiment of a tipped non-circular orifice.

As shown in FIG. 18 a tipped bushing can be used to produce non-circular fibers of the invention. The three legs 54 of the orifice have enlarged leg ends 56. The orifice is formed in the bottom end of a closed end tube tip 58.

When the invention is carried out using the rotary process, the "container" is a spinner rather than a feeder or bushing, and the non-circular orifices are positioned in the spinner peripheral wall rather than in the bushing bottom wall.

Figure 15:
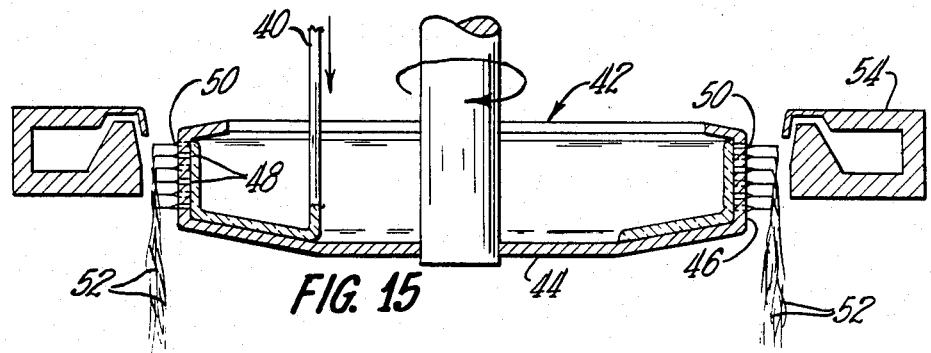
FIG. 15 is a schematic cross-sectional view in elevation of the invention applied to a rotary process.

As shown in FIG. 15, molten glass 30 can be supplied to rotating spinner 42. The molten glass impinges on bottom wall 44 of the spinner and flows outwardly by centrifugal force to the spinner peripheral wall 46. The spinner peripheral wall contains non-circular orifices 48 through which molten streams of glass 50 emanate. The relative motion of the glass streams emanating from the spinner and the air surrounding the spinner results in a quenching of the molten streams into glass fibers 52. To some extent, the rate of quenching can be controlled by the rotational rate of the spinner. An annular blower, such as blower 54, can be positioned concentrically around the spinner to turn the fibers down for collection of the fibers, which can be by conventional means.

Figure 16:
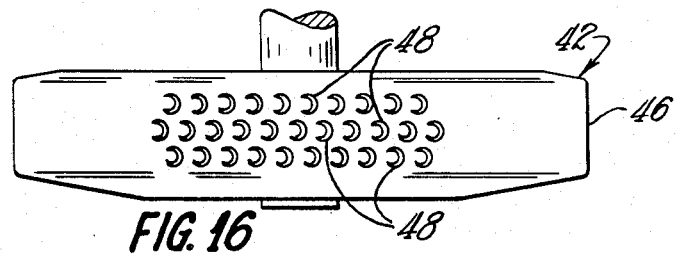
FIG. 16 is a schematic view in elevation of the spinner of FIG. 15.
Figure 17:
FIG. 17 is an enlarged cross-sectional view of a crescent-shaped fiber produced on the appratus of FIGS. 15 and 16.

The spinner can be adapted with non-circular orifices of various shapes, such as slots or crosses, and in various configurations. As shown in FIG. 16, the spinner can be adapted with crescent-shaped orifices to produce glass fiber 52 having the cross-sectional shape shown in FIG. 17.

EXAMPLE I

Continuous E glass trilobal fibers having an average mod ratio of about 2.3 were made from a tipless bushing having 20 trilobal orifices under the following conditions:

Trilobal Orifice size:
    depth: 0.15 in. (0.38 mm)
    width of eacdh leg: 0.009 in. (0.23 mm)
    length of each leg to center of orifice: 0.027 in. (0.69 mm)
Glass temperature =2190° F. (1200° C.)
Glass type: 200E
Bushing pressure (total): 8.7 psig (60 KPa)
Glass Flow rate: 0.034 lb/hr/hole (0.26 g/min/hole)
Number of filaments: 20
Hole pattern: 2 rows, 10 holes/row, staggered pattern
    spacing between rows: 0.125 inch (3.18 mm) hole
    spacing along row: 0.120 inch (3.05 mm)
Quench medium: air at 80° F. (27° C.)
Quench nozzle size: 1.5 in. (38.1 mm) horizontal ×0.25 in. (6.35 mm) vertical
Quench nozzle position:
    1 in. (25 mm) from center line of bushing (center line between two rows)
    15 degree angle from horizontal
Quench nozzle flow rate: 300 scfh (10.2 kg/hr)
Quench velocity:
    32 ft/s (9.8 m/s) at quench nozzle 29-32 ft/s (8.8-9.8 m/s) at bushing center line (very little velocity decay, if any)
Winder speed: 1550 ft/min (7.87 m/s)
Average fiber diameter: M filament 65 HT (16.5 microns) based on cross-sectional area EXAMPLES II AND III Continuous E glass trilobal fibers were made with a 14 hole tipped bushing using finshield quench. The tips were closed end tube tips with orifices of the design shown in FIG. 18 machined in the tip bottom. The particular dimensions of the design used determined the final fiber mod ratios. The following conditions pertained to all tips:

Tip tube diameter: 0.130 in. (3.3 mm)
Tip tube length: 0.240 in. (6.1 mm)
Tip end thickness (depth of orifice): 0.011 in. (0.28 mm)
Tip pattern:
    2 rows, 7 tips/row, straight pattern
    spacing between rows—0.030 in. (7.6 mm)
    tip spacing along row—0.23 in. (5.8 mm)
Finished geometry: fin thickness—0.055 in. (1.4 mm)
    fin height—0.625 in. (15.9 mm)
    fin length—1.68 in. (42.7 mm)
    fin blade spacing—0.23 in. (5.8 mm)
Glass Type: 200 E
Glass temperature: 2250° F. (1230° C.)
Bushing pressure (total): 1.1 psig (7.6 KPa)
Winder speed: Approximately 750 ft/min (3.81 m/s)
This varied somewhat during the experiments.

EXAMPLE II

Hole dimensions:
    D—0.025 in. (0.64 mm)
    P—0.020 in. (0.52 mm)
    W—0.010 in. (0.25 mm)
Glass flow rate: 0.018 lb/hr/hole (0.14 gm/min/hole)
Average fiber diameter: N filament, 70 HT (17.8 microns)
Average mod ratio: 2.2

EXAMPLE III

Hole dimensions:
    D—0.025 in. (0.064 mm)
    P—0.020 in. (0.51 mm)
    W—0.005 in. (0.13 mm)
Glass flow rate: 0.014 lb/hr/hole (0.106 gm/min/hole)
Average fiber diameter: L filament, 59 HT (14.9 microns)
Average mod ratio: 5.3

It will be evident from the foregoing that various modifications can be made to this invention. Such, however, are considered as being within the scope of the invention.

INDUSTRIAL APPLICABILITY

This invention will be found to be useful in the production of glass fibers for such uses as thermal and acoustical insulation products, and reinforcements for resin matrices.

We claim:

1. The method of making non-circular mineral fibers having a mod ratio greater than about 1.2 comprising discharging molten mineral material having a liquidus greater than about 1200° F. (649° C.) from non-circular orifices to produce molten streams of non-circular cross-section, said non-circular orifices being positioned in a wall of a container for holding a body of molten mineral material and the mineral material in said streams having a low enough initial viscosity that said streams would assume circular cross-sections in the absence of quenching, and quenching said streams to harden them into mineral fibers having a non-circular cross-sectional shape similar to the shape of said orifices before the streams can assume circular cross sections.

2. The method of claim 1 in which the mod ratio of the mineral fiber is within the range of from about 1.2 to about 7.

3. The method of claim 2 in which the mod ratio of the mineral fiber is within the range of from about 1.7 to about 3.0

4. The method of claim 1 in which the ratio of the viscosity (poises) to the surface tension (dynes/cm) is within the range of from about 0.1 to about 25.

5. The method of claim 4 in which the ratio of the viscosity (poises) to the surface tension (dynes/cm) is within the range of from about 0.25 to about 15.

6. The method of claim 5 in which the ratio of the viscosity (poises) to the surface tension (dynes/cm is within the range of from about 0.4 to about 10.

7. The method of making non-circular mineral fibers having a mod ratio greater than about 1.2 comprising discharging molten mineral material having a liquidus greater than about 1200° F. (649° C.) from non-cricular orifices positioned in a bushing wall to produce molten streams of non-circular cross-section, said bushing wall being positioned in a feeder containing molten mineral material and the mineral material in said streams having a low enough initial viscosity that said streams would assume circular cross-sections in the absence of quenching, and quenching said streams to harden them into mineral fibers having the approximate non-circular cross-sectional shape of said orifices before said streams can assume a circular cross-section.

8. The method of claim 7 in which the molten mineral material in said bushing at the orifices has pressure within the range of from about 0.4 psig (2,800 Pascals) to about 100 psig (690,000 Pascals).

9. The method of claim 8 in which the molten mineral material contained in said bushing is subjected to a hydrostatic pressure within the range of from about 0.7 psig (4,800 Pascals) to about 5.0 psig (34,000 Pascals).

10. The method of claim 7 comprising quenching said streams by directing a cooling fluid into contact with said streams.

11. The method of claim 7 comprising quenching said streams with fin shields.

12. The method of claim 10 in which the surface area ratio is within the range of from about 1.1 to about 5.

13. The method of claim 12 in which the polar moment of inertia ratio is within the range of from about 1.1 to about 7.

14. The method of claim 13 in which the inertial balance of the mineral fibers is within the range of from about 1.1 to about 25.

15. The method of making non-circular mineral fibers having a mod ratio greater than about 1.2 comprising discharging molten mineral material having a liquidus greater than about 1200° F. (649° C.) from non-circular orifices positioned in a bushing wall to produce molten streams of non-circular cross-section, said bushing wall being positioned in a feeder containing molten mineral materials and the mineral material in said streams having a low enough initial viscosity that said streams would assume circular cross-sections in the absence of quenching, and quenching said streams to harden them into fibers having a non-circular cross-sectional shape similar to the shape of said orifices before said streams can assume a circular cross-section, said quenching step being sufficient to satisfy the equation: $Z \leq 2$ where:

$$Z = (x_{75}\sigma_o/\mu_o r_{eo})*(1/v_o)*1/(MR_0-1)$$

and where:

$x_{75}$ is the distance from the bushing at 75 percent attenuation (cm);

$\mu_o$ is the initial viscosity (poise);

$r_{eo}$ is the initial equivalent fiber radius (cm);

$\theta_o$ is the initial surface tension of the mineral material (dynes/cm);

$v_o$ is the initial viscosity (cm/sec) through said orifices; and $MR_o$ is the initial mod ratio of said streams.

16. The method of making non-circular mineral fibers having a mod ratio greater than about 1.2 comprising discharging a plurality of streams of molten mineral material having a liquidus greater than about 1200° F. (649° C.) from a bushing containing a body of said molten mineral material, said streams being discharged through non-circular orifices in said bushing wall, said bushing wall being positioned in a feeder containing molten mineral materials and the mineral material in said streams having a low enough initial viscosity that said streams would assume circular cross-sections in the absence of quenching, and quenching said streams by directing cooling fluid into contact with said streams to harden said streams into mineral fibers having a non-circular cross-sectional shape similar to the shape of said orifices before surface tension forces can cuase the streams to assume circular cross-sections.

17. The method of claim 16 in which the mod ratio of the mineral fibers is within the range of from about 1.2 to about 7.0.

18. The method of making non-circular mineral fibers having a mod ratio greater than about 1.2 comprising discharging streams of molten mineral material having a liquidus greater than about 1200° F. (649° C.) from non-circular orifices to form mineral fibers, where the mineral material in said streams has a low enough initial viscosity that said streams would assume circular cross-sections in the absence of quenching, and preserving in the mineral fibers a non-circular cross-sectional shape similar to the shape of said orifice in the absence of perturbation of said streams.

19. The method of making non-circular mineral fibers having a mod ratio greater than about 1.2 comprising discharging molten mineral material having a liquidus greater than about 1200° F. (649° C.) from non-circular orifices positioned in a bushing wall to produce molten streams of non-circular cross-section, said bushing wall being positioned in a feeder containing molten mineral materials, said orifices being defined by orifice walls of substantially uniform height with respect to said bushing wall and the mineral material in said streams having a low enough initial viscosity that said streams would assume circular cross-sections in the absence of quenching, and quenching said streams to harden them into fibers with non-circular cross-sections before the streams can assume a circular cross-section.

20. The method of making non-circular mineral fibers having a mod ratio greater than about 1.2 comprising discharging molten mineral material having a liquidus greater than about 1200° F. (649° C.) from non-circular orifices positioned in a bushing wall to produce molten streams of non-circular cross-section, said bushing wall being positioned in a feeder containing molten mineral materials, said orifices being defined by orifice walls of substantially uniform temeperature and the mineral material in said streams having a low enough initial viscosity that said streams would assume circular cross-sections in the absence of quenching, and quenching said streams to harden them into fibers with non-circular cross-sections before the streams can assume circular cross-sections.

21. The method of making non-circular mineral fibers having a mod ratio greater than about 1.2 comprising discharging molten mineral material having a liquidus greater than about 1200° F. (649° C.) from non-circular orifices positioned in a bushing wall to produce molten streams of non-circular cross-section, said bushing wall being positioned in a feeder containing molten mineral materials and the mineral material in said streams having a low enough initial viscosity that said streams would assume circular cross-sections in the absence of quenching, and quenching said streams to harden them into fibers with non-circular cross-sections before the streams can assume circular cross-sections, each stream from each of said orfices being hardened into a mineral fiber without coming into contact with another of said streams.

22. Apparatus for making non-circular mineral fibers having a mod ratio greater than about 1.2 comprising an orificed bushing wall for discharging one or more streams of molten mineral material having a liquidus greater than about 1200° F. (649° C.), said orificed bushing wall being positioned in a container for holding a body of molten mineral material and the mineral material in said streams having a low enough initial viscosity that said streams would assume circular cross-sections in the absence of quenching, the orifices having a mod ratio within the range of from about 1.3 to about 25, and means for quenching said streams for form mineral fibers having a non-circular cross-sectional shape similar to the shape of said orifices.

23. Apparatus for making non-circular mineral fibers having a mod ratio greater than about 1.2 comprising a plurality of orifices positioned in a bushing wall for discharging one or more streams of molten mineral material having a liquidus greater than about 1200° F. (649° C.), said bushing wall being positioned in a feeder containing molten mineral materials, said orifices having a mod ratio within the range of from about 1.3 to about 25 and the mineral material in said streams having a low enough initial viscosity that said streams would assume circular cross-sections in the absence of quenching, and means for quenching said streams to form mineral fibers having a non-circular cross-sectional shape similar to the shape of said orifices.

24. The apparatus of claim 23 in which said means for quenching comprises fin shields.

25. The apparatus of claim 23 in which the mod ratio of the orifices is within the range of from about 1.7 to about 10.

26. The apparatus of claim 23 in which said orifices have a depth within the range of from about 0.001 in. (0.025 mm) to about 0.250 in. (6.4 mm).

27. The apparatus of claim 23 in which said bushing further contains a plurality of substantially circular orifices for discharging streams of molten mineral material having substantially circular cross-sections.

28. The apparatus of claim 23 in which the surface area ratio of said orifices is within the range of from about 1.1 to about 16.

29. The apparatus of claim 23 in which the polar moment of inertia ratio of the shape of the orifices is within the range of from about 1.1 to about 50.

30. The apparatus of claim 23 in which the inertial balance of the shape of the orifice is within the range of from about 1.1 to about 100.

31. Apparatus for making non-circular mineral fibers having a mod ratio greater than about 1.2 comprising a plurality of orifices positioned in a bushing wall for discharging one or more streams of molten mineral material having a liquidus greater than about 1200° F. (649° C.), said bushing wall being positioned in a feeder containing molten mineral material, said orifices having a mod ratio within the range of from about 1.3 to about 25 and the mineral material in said streams having a low enough initial viscosity that said streams would assume circular cross-sections in the absence of quenching, and means for quenching said streams to form mineral fibers having a non-circular cross-sectional shape similar to the shape of said orifices, where said means for quenching is sufficient to satisfy the equation $Z \leq 2$ where:

$$Z = (x_{75}\sigma_o/\mu_o r_{eo}) * (1/v_o) * 1/(MR_o - 1)$$

and where:
$x_{75}$ is the distance from the bushing at 75 percent attenuation (cm);
$\mu_o$ is the initial viscosity (poise);
$r_{eo}$ is the initial equivalent fiber radius (cm);
$\sigma_o$ is the initial surface tension of the mineral material (dynes/cm);
$v_o$ is the initial viscosity (cm/sec) through said orifices; and
$MR_o$ is the initial mod ratio of said streams.

32. Apparatus for making non-circular mineral fibers having a mod ratio greater than about 1.2 comprising an orificed tipless bushing wall for discharging streams of molten mineral material having a liquidus greater than about 1200° F. (649° C.), said bushing wall being positioned in a feeder containing molten mineral material, said orifices being tri-lobal and having a mod ratio within the range from about 1.7 to about 10 and the mineral material in said streams having a low enough initial viscosity that said streams would assume circular cross-sections in the absence of quenching, and means for quenching said streams to form mineral fibers having a non-circular cross-sectional shape similar to the shape of said orifices.

33. Apparatus for making non-circular mineral fibers having a mod ratio greater than about 1.2 comprising a plurality of orifices positioned in a bushing wall for discharging streams of molten mineral material having a liquidus greater than about 1200° F. (649° C.), said bushing wall being positioned in a feeder containing molten mineral material, said orifices having a mod ratio within the range of from about 1.3 to about 25, said orifices being defined by orifice walls of substantially uniform height with respect to said bushing and the mineral material in said streams having a low enough initial viscosity that said streams would assume circular cross-sections in the absence of quenching, and means for quenching said streams to form non-circular mineral fibers.

34. Apparatus for making non-circular mineral fibers having a mod ratio greater than about 1.2 comprising a plurality of orifices positioned in a bushing wall for discharging streams of molten mineral material having a liquidus greater than about 1200° F. (649° C.), said bushing wall being positioned in a feeder containing molten mineral material, said orifices having a mod ratio within the range of from about 1.3 to about 25, said orifices being defined by orifice walls of substantially uniform temperature and the mineral material in said streams having a low enough initial viscosity that said streams would assume circular cross-sections in the absence of quenching, and means for quenching said streams to form non-circular mineral fibers.

* * * * *